United States Patent
Kanie

(10) Patent No.: US 8,088,524 B2
(45) Date of Patent: Jan. 3, 2012

(54) FUEL BATTERY SYSTEM

(75) Inventor: Naoki Kanie, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 34 days.

(21) Appl. No.: 12/810,465

(22) PCT Filed: Dec. 1, 2008

(86) PCT No.: PCT/JP2008/071764
§ 371 (c)(1),
(2), (4) Date: Jun. 24, 2010

(87) PCT Pub. No.: WO2009/081693
PCT Pub. Date: Jul. 2, 2009

(65) Prior Publication Data
US 2010/0279186 A1      Nov. 4, 2010

(30) Foreign Application Priority Data
Dec. 26, 2007   (JP) ................................ 2007-333983

(51) Int. Cl.
*H01M 8/04* (2006.01)
(52) U.S. Cl. ........................................ 429/429; 429/430
(58) Field of Classification Search .................. None
See application file for complete search history.

(56) References Cited

U.S. PATENT DOCUMENTS

2009/0110985 A1*  4/2009  Manabe et al. ................. 429/23
2009/0169934 A1*  7/2009  Manabe et al. ................. 429/22
2009/0226770 A1*  9/2009  Manabe et al. ................. 429/13

FOREIGN PATENT DOCUMENTS

| JP | 7-235324 A | 9/1995 |
|---|---|---|
| JP | 2007-012414 A | 1/2007 |
| JP | 2007-018741 A | 1/2007 |
| JP | 2007-149572 A | 6/2007 |
| JP | 2007-282315 A | 10/2007 |
| JP | 2008-146937 A | 6/2008 |
| WO | WO 2005/088753 A1 | 9/2005 |

OTHER PUBLICATIONS

Office Action dated Mar. 15, 2001 in JP 2007-333983 and English translation thereof.

* cited by examiner

*Primary Examiner* — John S Maples
(74) *Attorney, Agent, or Firm* — Kenyon & Kenyon LLP

(57) ABSTRACT

A fuel battery system comprises a fuel battery stack, a hydrogen supply system for supplying hydrogen from a hydrogen tank, an oxidant gas supply system for supplying air serving as an oxidant by an air compressor, an electrical system including an impedance measuring unit for measuring the impedance of a fuel battery, a DC/DC converter for converting generated electric power, a secondary battery for storing electric power, and so on, and a drive system for driving a vehicle. When the power generation is stopped by turning off an ignition switch in the state in which the power generation is suspended in an intermittent operation, the impedance measuring unit measures the impedance after the supply of air is stabilized to avoid the transient state of the fuel battery cell caused by a delay in air supply.

4 Claims, 3 Drawing Sheets

FUEL BATTERY SYSTEM

This is a 371 national phase application of PCT/JP2008/071764 filed 1 Dec. 2008, claiming priority to Japanese Patent Application No. JP 2007-333983 filed 26 Dec. 2007, the contents of which are incorporated herein by reference.

FIELD OF THE INVENTION

The present invention relates a fuel battery system having a gas supply means for supplying fuel gas and oxidant gas to a fuel battery, and an impedance measuring means for measuring impedance of the fuel battery.

BACKGROUND OF THE INVENTION

In recent years, fuel batteries which use hydrogen as fuel gas and oxygen as oxidant gas to generate electric energy from an electrochemical reaction have been developed and applied to vehicles, vessels, small power generators, and so on. Fuel batteries used for these applications not only generate electric energy from an electrochemical reaction but also produce reaction water. Most of the produced reaction water is discharged outside a fuel battery, but the reaction water partially remains within a fuel battery. In particular, as vehicles may be used in a low temperature environment falling below zero, a problem may occur in that the power generation of a fuel battery is disabled because the residual reaction water in the fuel battery is frozen preventing reaction gas from reaching the anode and cathode of the fuel battery.

In order to resolve such a problem, in JP 2007-149572 A (Patent Document 1), when the power generation is stopped, undesired water within a fuel battery is removed by a scavenging operation executed by an air compressor. More specifically, Patent Document 1 discloses techniques for scavenging water within a fuel battery cell by indirectly obtaining the amount of water within the fuel battery cell from measurement of internal resistance using an AC impedance method to determine when to stop scavenging.

The internal resistance of a fuel battery is known to be influenced by a humidity level of internal electrolyte film. When the amount of water within a fuel battery is small and the internal electrolyte film is dry, the internal resistance increases and the output voltage of the fuel battery is decreased. On the other hand, when the amount of water within a fuel battery is excessive, the anode and cathode of the fuel battery is covered with a water film, similarly resulting in a decreased output voltage of the fuel battery. Therefore, the management of the amount of water within a fuel battery is important.

Patent Document 1: JP 2007-149572 A

SUMMARY OF THE INVENTION

Objects to be Achieved by the Invention

By using the above-described Patent Document 1, it is generally possible to scavenge water to a sufficient amount. However, there are occasions where the scavenging process is stopped due to an abnormal value of an internal resistance when an impedance measurement is executed after a forced stop of unfinished scavenging for some reason. One of the possible reasons for such a situation is that by the principle of the impedance measurement, a false detection may occur when the amount of power generated by the fuel battery is small because of distortion or noise of sine waves or the like due to a lowered response to superimposed sine waves.

For this reason, in particular, in a case where scavenging is stopped by turning OFF an ignition switch in the state in which the power generation is suspended in an intermittent operation, an accurate measurement of internal resistance in an impedance measurement may be impossible because of insufficient supply of air due to air compressor delay at start-up.

In order to resolve such a problem, an object of fuel battery systems according to the present invention is to provide a fuel battery system which can execute an accurate impedance measurement even after an intermittent operation.

Means for Achieving the Objects

In order to achieve the above object, a fuel battery system according to one embodiment of the present invention comprises a fuel battery, a gas supplying means for supplying fuel gas and oxidant gas to the fuel battery, and an impedance measuring means for measuring impedance of the fuel battery, wherein the fuel battery comprises an air compressor for supplying air as the oxidant gas; a recording means for recording information indicating that an impedance measurement has not been executed within a predetermined time due to an intermittent operation of the air compressor, and, when operated after an ignition switch is turned OFF, the impedance measuring means determines, based on the intermittent operation information recorded in the recording means, an operation state of the air compressor, and then starts measuring impedance in consideration of start-up time of the air compressor required until the power generated by the fuel battery reaches a maximum, and at least a portion of excessive reaction water can be discharged.

In the fuel battery system according to another embodiment of the present invention, the impedance measuring means executes impedance measurement after the impedance measuring means increases a number of times to measure impedance based on the intermittent operation information recorded in the recording means and a rotational speed of the air compressor exceeds a predetermined rotational speed at which at least a portion of excessive reaction water can be discharged.

In the fuel battery system according to another embodiment of the present invention, the impedance measuring means executes impedance measurement after the impedance measuring means increases a number of times to measure impedance based on the intermittent operation information recorded in the recording means and a volume of air flow produced by the air compressor exceeds a predetermined volume of air flow at which at least a portion of excessive reaction water can be discharged.

Effects of the Invention

By using a fuel battery system according to the present invention, an accurate measurement of an internal resistance becomes possible by executing the impedance measurement in consideration of an air compressor delay at a start-up in a case where scavenging is stopped by turning OFF an ignition switch in the state in which the power generation is suspended in an intermittent operation.

Accurate control of fuel batteries also becomes possible by using a fuel battery system according to the present invention without complicating the system because the amount of residual water within a fuel battery can be detected with high accuracy.

Figure 1:
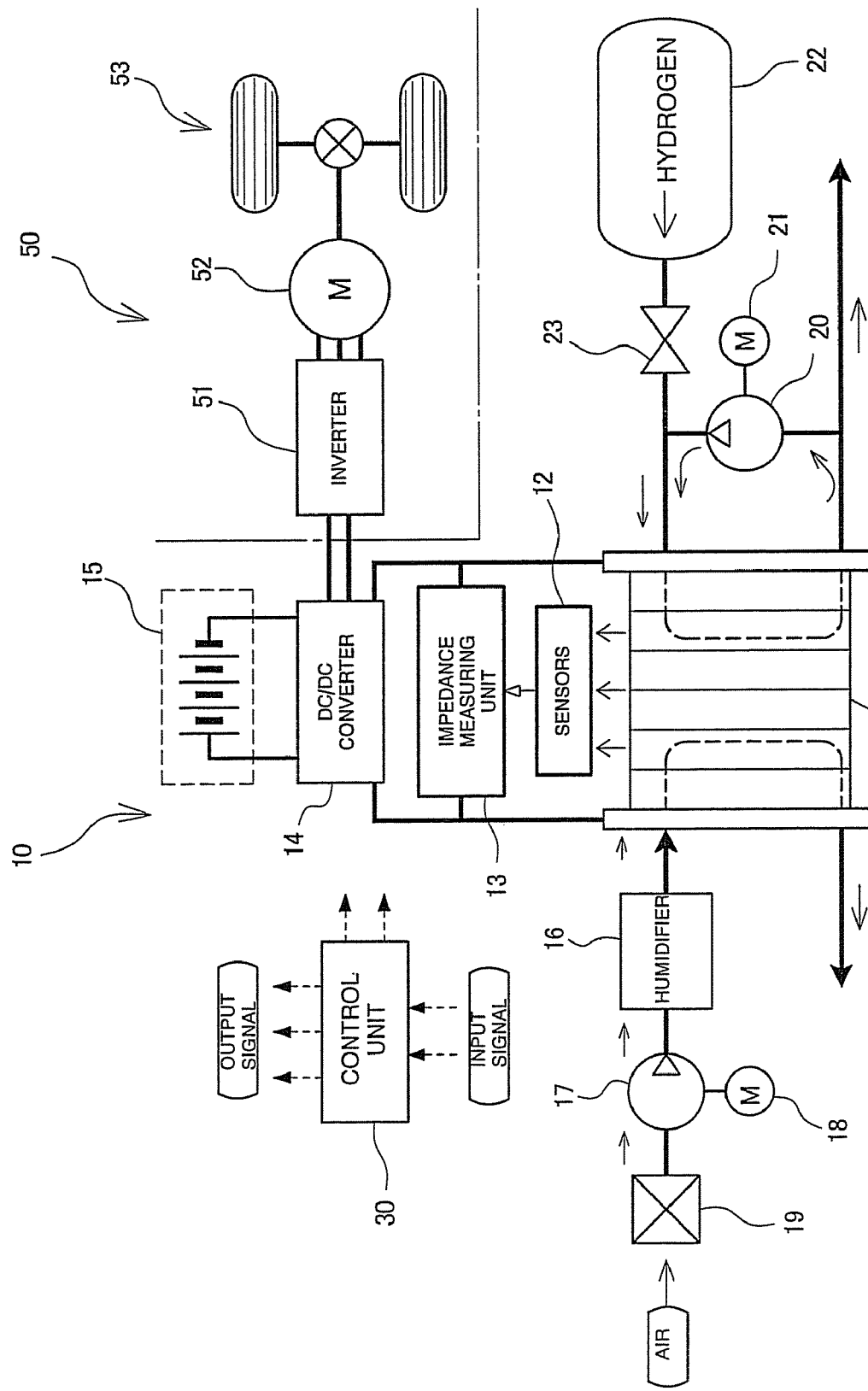
FIG. 1 is a block diagram showing an overall configuration of a fuel battery system according to one embodiment of the present invention.

REFERENCE NUMERALS 10 fuel battery system, 11 fuel battery stack, 12 sensors, 13 impedance measuring unit, 14 DC/DC converter, 15 secondary battery, 16 humidifier, 17 air compressor, 18 air compressor motor, 19 air filter, 20 circulation pump, 21 circulation pump motor, 22 hydrogen tank, 23 valve, 30 control unit, 50 drive system, 51 inverter, 52 drive motor, 53 wheels

DETAILED DESCRIPTION

Best modes (hereinafter referred to as "embodiments") for carrying out the present invention are described below in accordance with drawings.

FIG. 1 shows an overall configuration of a fuel battery system 10 mounted on a vehicle. The fuel battery system 10 includes, in broad groups, a fuel battery stack 11, a hydrogen supply system, an oxidant gas supply system, an electrical system for converting and storing the generated electric power, and a driving system 50 for driving a vehicle. The fuel battery stack 11 is a stacked body of fuel battery cells (unit cells) each of which is a minimum element. The hydrogen supply system for supplying hydrogen gas to the fuel battery stack 11 is provided with a hydrogen tank 22 for storing the hydrogen gas, valve 23 for allowing or stopping the supply of hydrogen gas, a circulation pump 20 and a circulation pump motor 21 for circulating, in a hydrogen supply channel, off-gas including unreacted hydrogen gas discharged from the fuel battery stack 11, and a discharge port for discharging the off-gas.

The oxidant gas supply system is provided with an air compressor 17 and an air compressor motor 18 for intaking air to be used as oxidant gas through an air filter 19 into the fuel battery stack 11, a humidifier 16 for humidifying the fuel battery stack 11, and a discharge port for discharging the air.

The electrical system includes a DC/DC converter 14 for supplying electrical power generated by the fuel battery stack 11 to a secondary battery 15; sensors 12 for measuring current, temperature, amount of air flow, hydrogen gas pressure, and humidification amount of the fuel battery cell to output the measured values to an impedance measuring unit 13 and a control unit 30; the impedance measuring unit 13 for measuring internal resistance of the fuel battery stack 11; and a control unit 30 for controlling these elements.

The driving system 50 includes an inverter 51 for controlling a drive motor 52 by using electric power supplied from the DC/DC converter 14 and a drive mechanism for transmitting a drive force of the drive motor 52 to wheels 53.

The impedance measuring unit 13 has a sine-wave frequency sweep function using the electric power supplied from the DC/DC converter 14. By measuring the values of real part and imaginary part of AC impedance, the impedance measuring unit 13 measures the internal resistance in the fuel battery cell which is a sum of ohm resistance representing DC resistance of a separator or electrolyte film, reaction resistance representing a resistance caused by chemical reaction with a catalyst, and diffusion resistance representing a resistance opposing the fuel gas or oxidant gas from reaching the catalyst.

Figure 2:
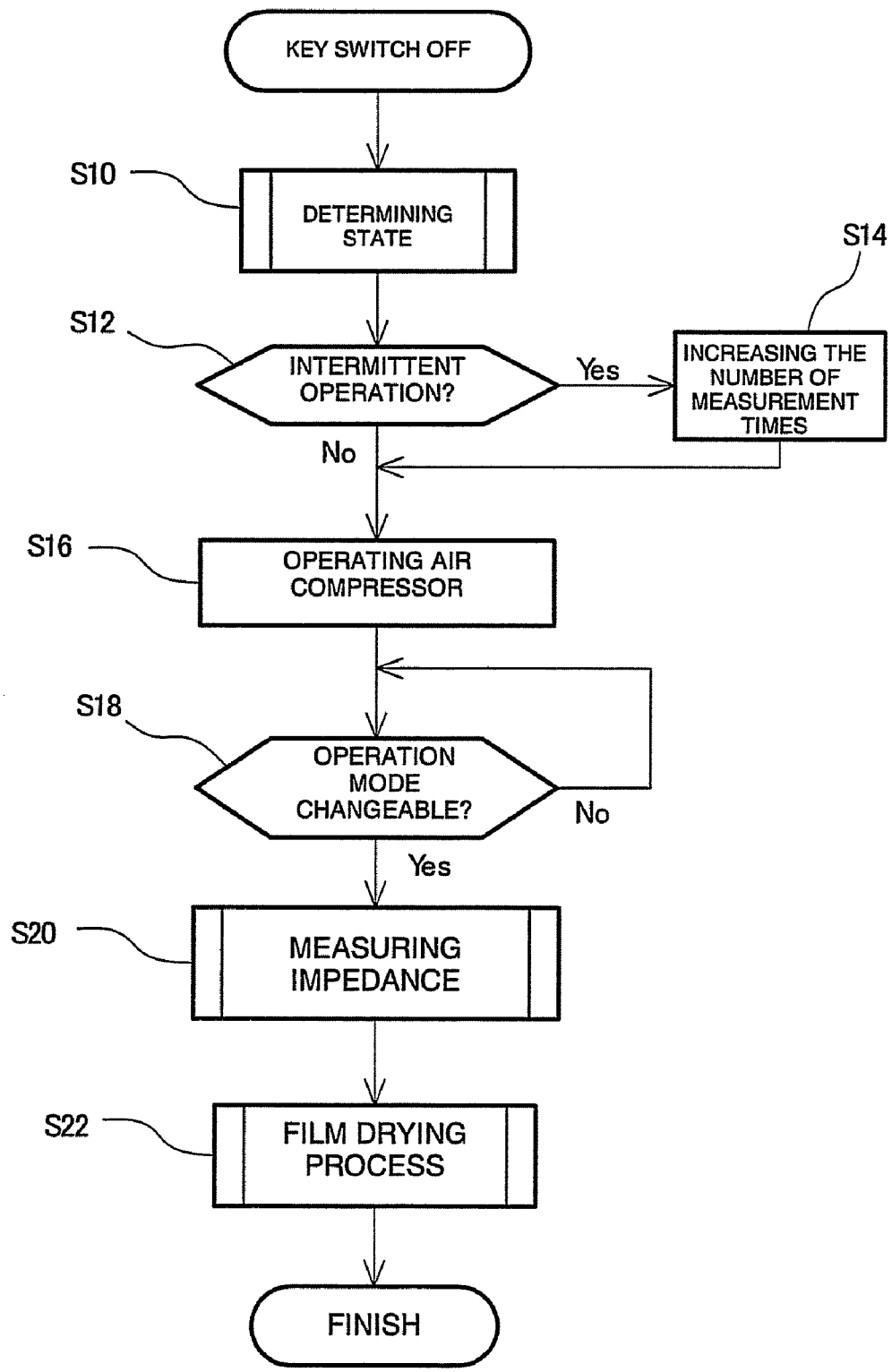
FIG. 2 is a flow chart showing flow of a scavenging process after a key switch of a fuel battery system is turned OFF.

FIG. 2 shows a flow of a scavenging process of the fuel battery system after a key switch is turned OFF. One of the features of this embodiment is that in a case where the power generation is stopped by turning OFF an ignition switch (IG) in the state in which the power generation is suspended in an intermittent operation, the impedance measuring unit executes an impedance measurement after the supply of air is stabilized to avoid the transient state of the fuel battery cell caused by a delay in air supply.

This control is executed by a program stored in the control unit 30. First, when the control unit 30 detects that a key switch such as an ignition switch is turned OFF (IG-OFF), the control unit 30, in step S10, stops the power generation at the fuel battery stack 11 and measures a voltage, electric current, temperature of the fuel battery, and the like using the sensors 12. In step 12, the control unit 30 determines, based on a difference between current time and time recorded in the control unit 30 indicating when a key switch was previously turned OFF, whether or not the current operation is an intermittent operation. When the control unit 30 determines that the current operation is an intermittent operation, the control unit 30, in step S14, increases the number of times of the impedance measurement to greater than a normally defined number of times. On the other hand, when the control unit 30 determines that the current operation is not an intermittent operation, the control unit 30 proceeds to step S16 and causes the fuel battery to operate in a high output mode, which is one of three output modes, low, middle, and high.

In step S16, the control unit 30 starts the operation of the air compressor and increases the rotational speed of the air compressor. Then, after confirming that the operation mode is in "high output mode", the control unit 30 counts time until a predetermined time (such as time required for the rotational speed to be stabilized, for example, a few seconds) elapses, or alternatively in step S18, the control unit 30 determines whether or not the fuel battery cell actually responds. When the control unit 30 determines that the fuel battery cell responds, the control unit 30 executes the impedance measurement in step S20. Further, the control unit 30 executes a film drying process (step S22) by using estimated time required for drying the film based on the amount of water obtained from the impedance measurement. The process after a key switch OFF is completed with the above steps. It should be noted that it is also preferable to use a power generation voltage, amount of air supply, rotational speed of the air compressor, and the like as other information used for determination in step 18.

Figure 3:
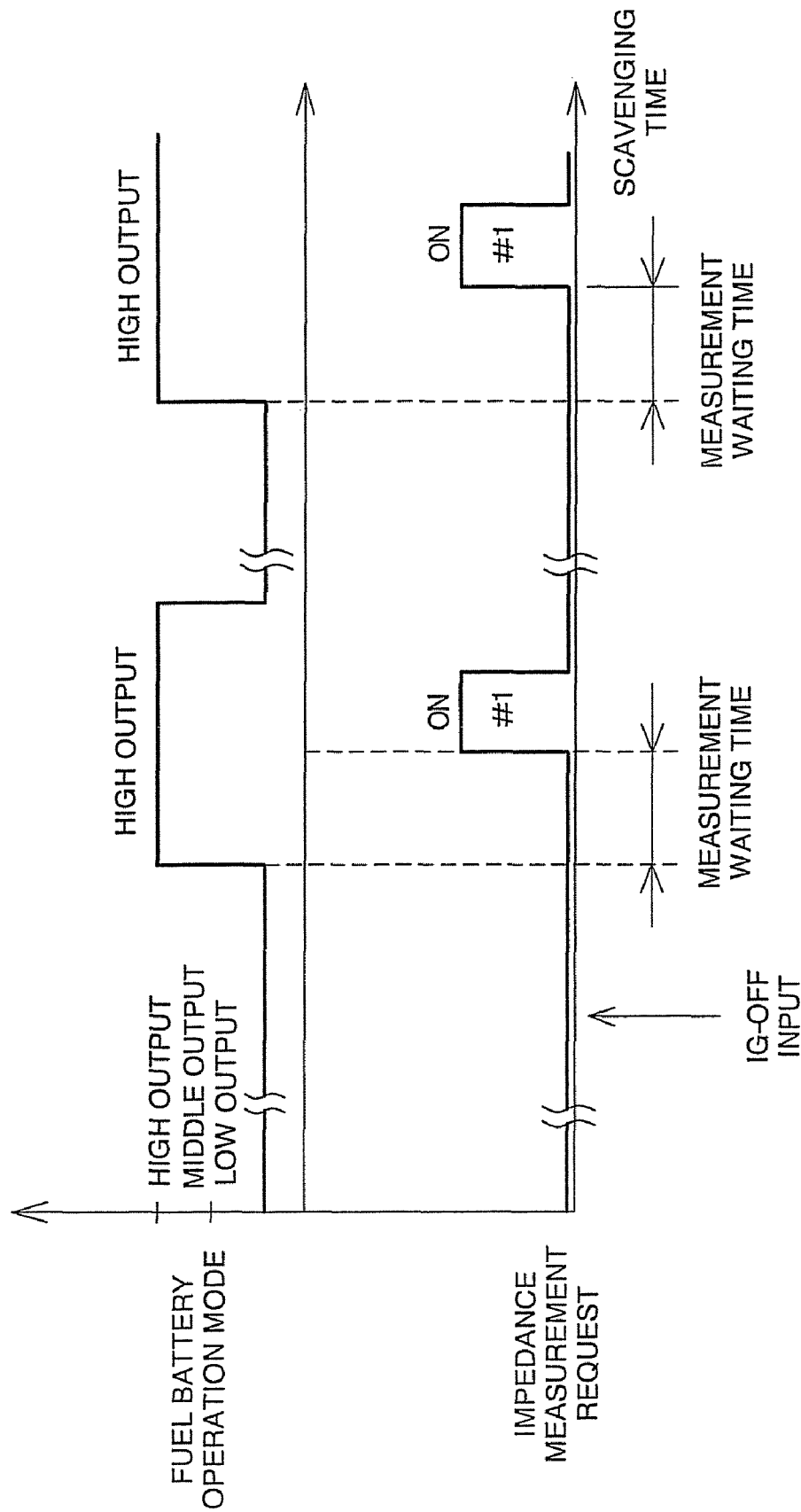
FIG. 3 is a graph showing an example of timing for requesting impedance measurement in a fuel battery system according to one embodiment of the present invention.

FIG. 3 shows an example of timing between an output request and an impedance measurement request, both of which are issued from the control unit of the fuel battery system to the fuel battery. As described above, due to the principle of the impedance measurement, a false detection may occur when the amount of power generated by the fuel battery is small, because of distortion or noise on sine waves or the like due to a lowered response to superimposed sine waves. Therefore, in the present embodiment, in the process after a key switch OFF, the operation mode of the fuel battery is set to the high output mode before measuring the impedance. In measuring impedance, a valve 23 of the hydrogen supply system is closed and the off-gas from which reaction water is removed by a gas-liquid separator is circulated by the circulation pump 20 to enable the impedance measurement after substantially stopping the fuel battery.

As described above, an accurate measurement of internal resistance becomes possible by using the fuel battery system according to the present embodiment in which the impedance measurement is executed in consideration of an air compressor delay at start-up in a case where scavenging is stopped by turning OFF an ignition switch in the state in which the power generation is suspended in an intermittent operation.

By using a fuel battery system according to this embodiment, it is also possible, without complicating the system, to sufficiently control a fuel battery because it is possible to detect the amount of residual water within the fuel battery with high accuracy.

INDUSTRIAL APPLICABILITY

An impedance measuring means according to an embodiment of the present invention for measuring impedance of a fuel battery system can be applied to a fuel battery system having a gas supply means for supplying fuel gas and oxidant gas to a fuel battery.

The invention claimed is:

1. A fuel battery system comprising a fuel battery, a gas supplying device for supplying fuel gas and oxidant gas to the fuel battery, and an impedance measuring device for measuring impedance of the fuel battery, the fuel battery system comprising:
    an air compressor for supplying air which is the oxidant gas to the fuel battery;
    a key switch for instructing a start or a stop to the fuel battery system; and
    a controller for executing a film drying process based on an amount of water obtained by measurement of impedance when the key switch is switched OFF, wherein
    the controller changes an operation mode of the fuel battery from a low output mode to a high output mode upon detecting that that the key switch is switched OFF, so as to avoid an excessive state of the fuel battery in an estimated start-up time of the air compressor caused by the change of the operation mode, and executes the impedance measurement after detecting that the supply of air has been stabilized.

2. The fuel battery system according to claim 1, wherein the controller detects that the supply of air has been stabilized by detecting that a predetermined time period from an increase of a rotational speed of the air compressor to a stabilization of the rotational speed of the air compressor has elapsed.

3. The fuel battery system according to claim 1, wherein the controller detects that the supply of air has been stabilized by detecting that a rotational speed of the air compressor has exceeded a predetermined rotational speed.

4. The fuel battery system according to claim 1, wherein the controller detects that the supply of air has been stabilized by detecting that a volume of air flow from the air compressor has exceeded a predetermined volume.

* * * * *